Sept. 23, 1958    M. O. TEETOR    2,853,331
MAGNETIC CATCH
Filed Dec. 23, 1953    3 Sheets-Sheet 1
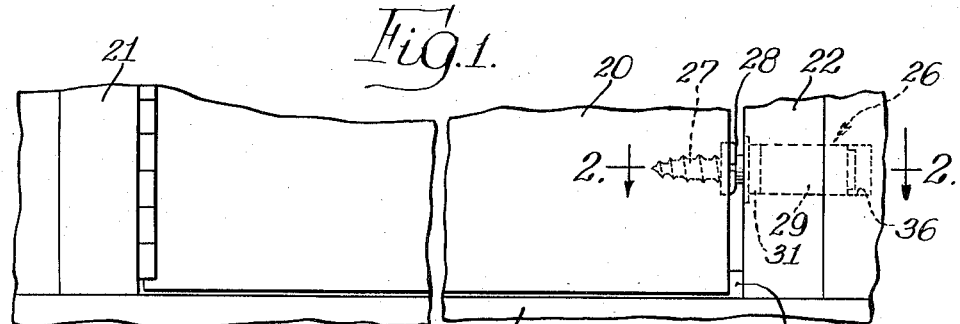
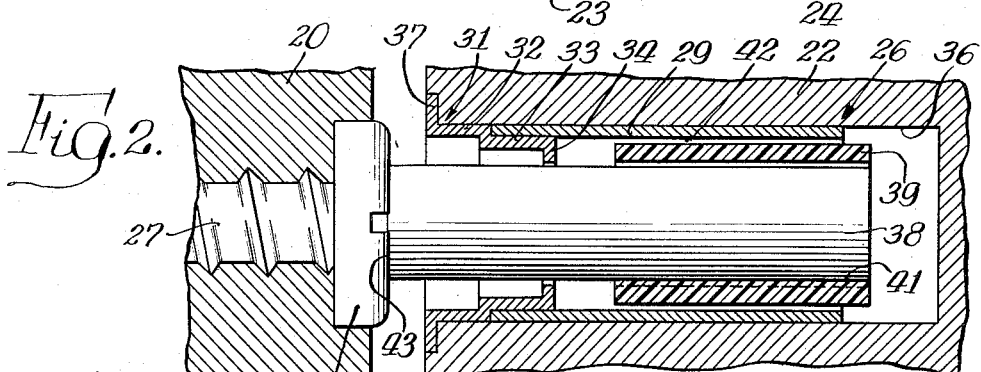
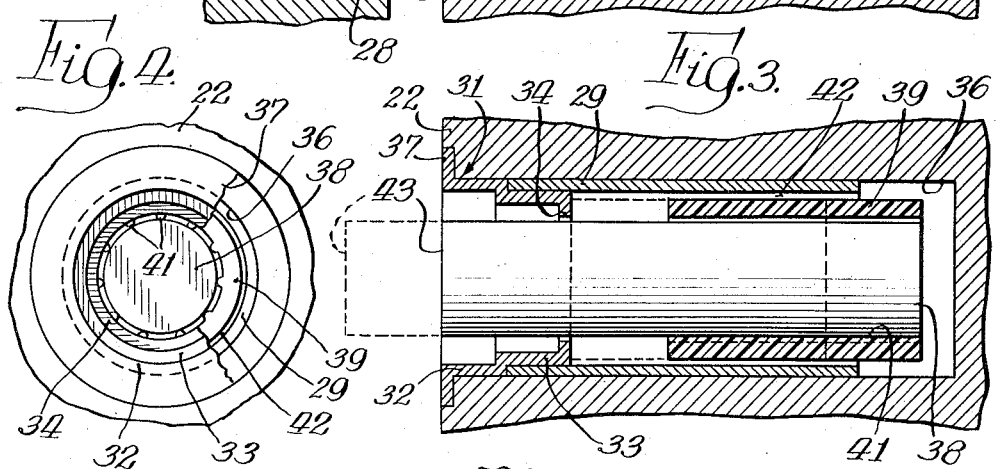
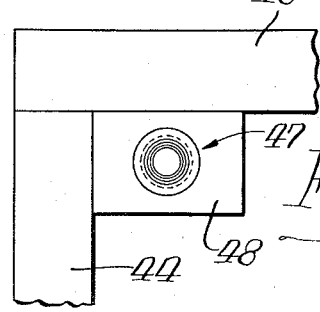
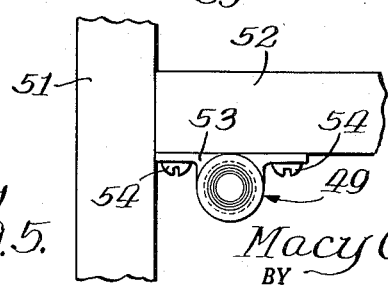
INVENTOR.
Macy O. Teetor,
BY
Davis, Lindsey, Hibben & Noyes Attys.

Sept. 23, 1958   M. O. TEETOR   2,853,331
MAGNETIC CATCH
Filed Dec. 23, 1953   3 Sheets-Sheet 2
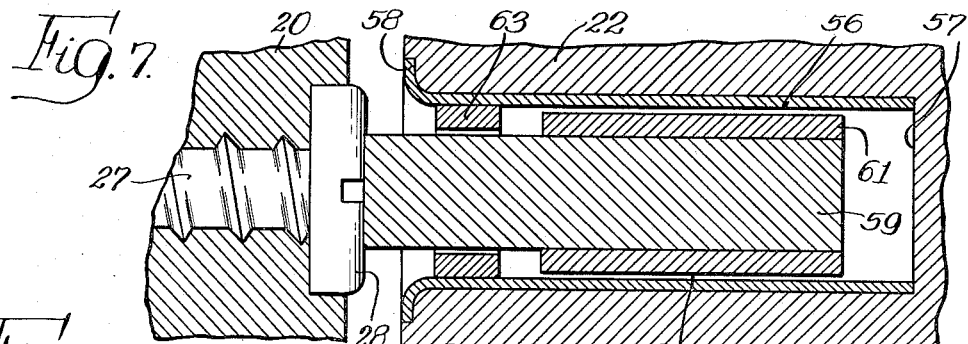
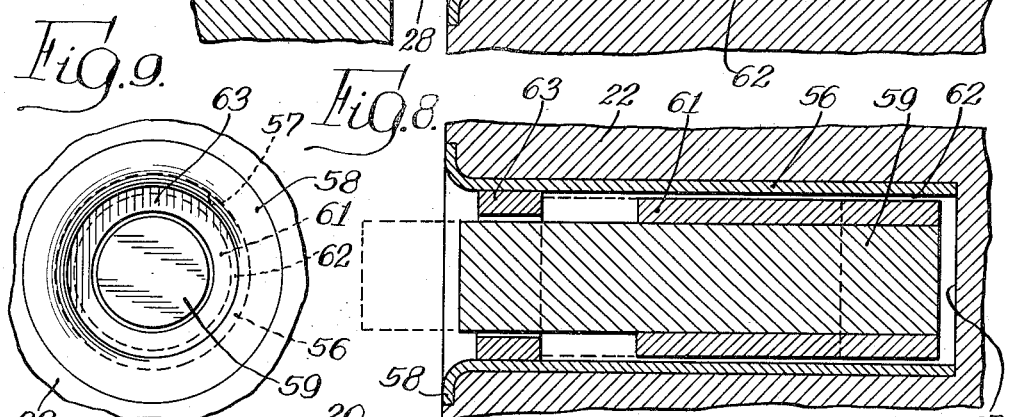
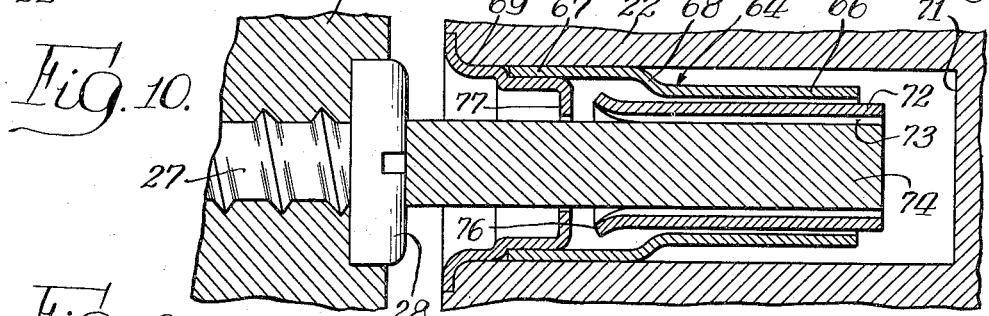
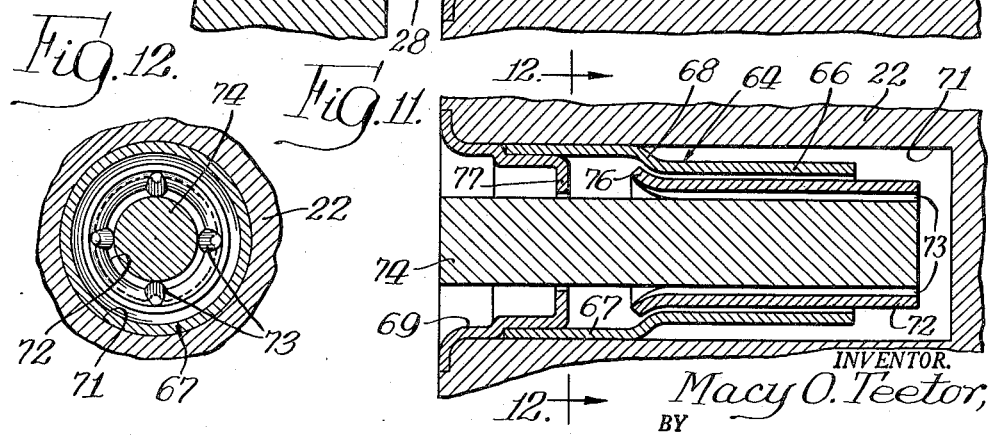
INVENTOR.
Macy O. Teetor,
BY
Davis, Lindsey, Hebben & Noyes   Attys.

Sept. 23, 1958　　　　M. O. TEETOR　　　　2,853,331
MAGNETIC CATCH
Filed Dec. 23, 1953　　　　　　　　　　3 Sheets-Sheet 3
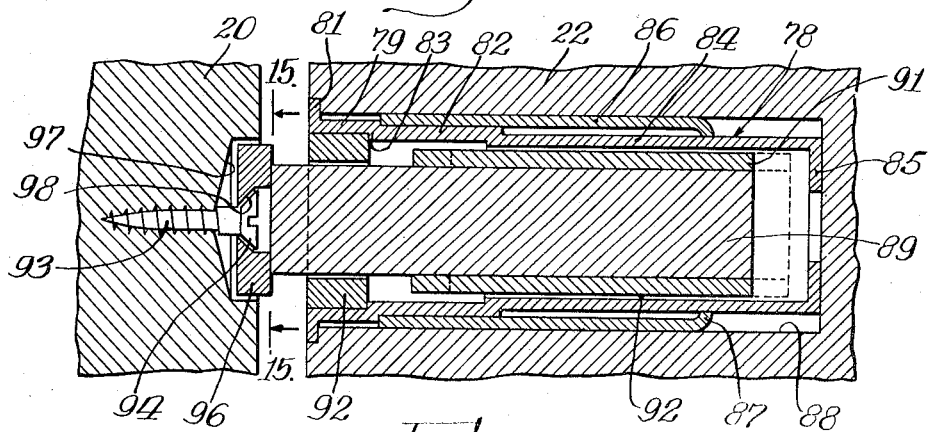
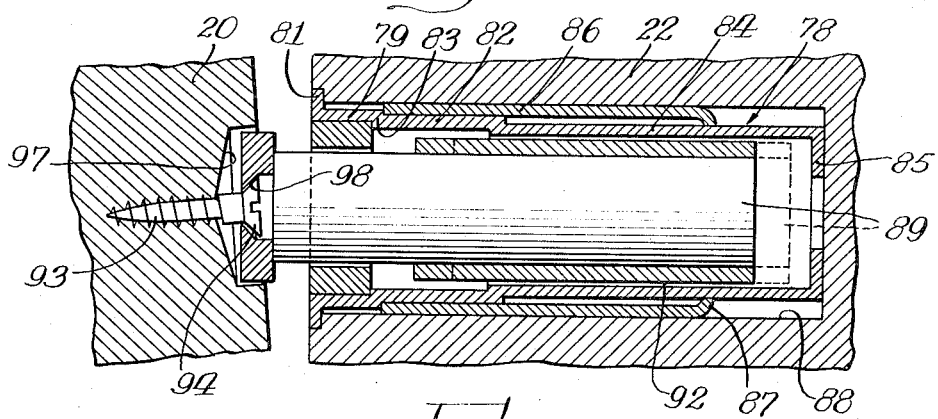
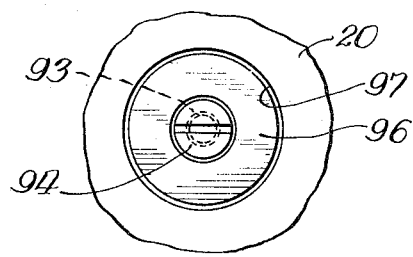
INVENTOR.
Macy O. Teetor
BY
Davis, Lindsey, Hibben & Noyes Attys.

United States Patent Office 2,853,331
Patented Sept. 23, 1958

2,853,331

MAGNETIC CATCH

Macy O. Teetor, New Orleans, La.

Application December 23, 1953, Serial No. 399,994

17 Claims. (Cl. 292—251.5)

This application is a continuation-in-part of my copending application Serial No. 367,148, filed July 10, 1953, now abandoned.

This invention relates to a novel device utilizing magnetic principles for retaining a closure member in closed position adjacent a frame member and more particularly to a novel magnetic catch for use on a cabinet door.

Magnetic door catches of various types have been suggested heretofore in which cooperating magnet and armature units are mounted in coacting positions on door and frame members. In some cases, the magnetic attractive forces are exerted in a direction transverse to the plane of the hinged door so that as the door approaches closed position the magnet unit exerts a positive force tending to move the door to closed position. In other words, in an installation of this type the magnet unit may actually assist in effecting closure of the door as well as retaining the door in closed position. In other cases, the magnet and armature units are mounted in coacting relation adjacent an edgewise surface of the door so that the magnetic attractive forces act in a lateral direction substantially in the plane of the door. In a device of the latter type the catch acts primarily to retain the door in closed position by reason of the surface contact and frictional resistance between the magnet and the armature elements.

In my prior Patent No. 2,508,305, I have shown one type of magnetic catch which is highly effective and provides a number of important advantages over other magnetic and non-magnetic catches heretofore suggested. One of the principal features of my prior invention involves the movable mounting of one of the catch elements, i. e. either the magnetic element or the armature element, and also the use of a spring member operatively coacting with the movable catch element for normally urging it into retracted position inwardly of its supporting door or frame member.

The present invention is directed to an improved magnetic catch including a retractable magnet element which operates on a unique principle in the magnetic catch art. The invention is characterized by the complete elimination of any spring or other resilient mechanical device for retracting the magnet element. Consequently, the catch of the present invention is relatively inexpensive and is extremely simple to manufacture, assemble and install. Also, as will hereinafter appear, the catch of the present invention lends itself readily for either of the general modes of installation described above, i. e. with the magnetic attractive forces being exerted generally transversely to the plane of the door or generally laterally and substantially in the plane of the door.

Accordingly, a primary object of the present invention is to provide an improved and simplified magnetic catch which operates on a completely novel principle as compared with devices of this class heretofore suggested.

A further object of the invention is to provide a novel magnetic catch having a movable magnet element adapted to engage a cooperating armature element and to be retracted therefrom but without the use of a spring or like mechanical device.

Another object of the invention is to provide novel means utilizing only magnetic attractive forces for effecting retraction of the magnet element of a magnetic catch.

An additional object of the invention is to provide a novel magnetic door catch having an extremely simple and economical construction and especially adapted for use as a friction catch with the magnetic attractive forces being exerted in a generally lateral direction and substantially in the plane of the door but also being readily adapted for use with the magnetic attractive forces being exerted generally transversely to the plane of the door.

Other objects and advantages of the invention will become evident from the subsequent detailed description taken in conjunction with the accompanying drawings, wherein:

Fig. 1 is a fragmentary front elevational view of a cabinet provided with a magnetic door catch embodying the features of the present invention;

Fig. 2 is a fragmentary horizontal sectional view on an enlarged scale, as taken along the line 2—2 of Fig. 1, and showing the position of the catch elements when the door is closed;

Fig. 3 is a view similar to Fig. 4 but showing the movable catch element in retracted position when the cabinet door is open;

Fig. 4 is a fragmentary view, with portions of the structure broken away, as seen from the left end of the device illustrated in Fig. 3;

Fig. 5 is a fragmentary view on a reduced scale showing a different method of mounting the device on a cabinet;

Fig. 6 is a fragmentary view on a reduced scale of still another method of mounting the device;

Fig. 7 is a view similar to Fig. 2 but showing a modified form of the invention;

Fig. 8 is a view similar to Fig. 7 but showing the device in retracted position when the cabinet door is open;

Fig. 9 is a fragmentary end view as seen from the left in Fig. 8;

Fig. 10 is a view similar to Fig. 2 but showing still another modification of the invention;

Fig. 11 is a view similar to Fig. 10 but showing the device in retracted position;

Fig. 12 is a transverse cross-sectional view as taken along the line 12—12 of Fig. 11;

Fig. 13 is a view similar to Fig. 2 but showing a further embodiment of the invention;

Fig. 14 is a view similar to Fig. 13 and illustrating one of the advantages of this form of the invention; and Fig. 15 is a view taken along the line 15—15 of Fig. 13 and showing the armature unit in elevation.

Referring first to Fig. 1 of the drawing, a portion of a cabinet is shown comprising a door 20 hingedly secured to a frame having vertical side portions 21 and 22 and a sill or base 23. An elongated strip or door stop 24 is provided on the base 23 in inwardly recessed relation from the front thereof, the door 20 being adapted to abut the strip 24 when the door is in closed position.

A magnetic catch is provided embodying the features of my invention and consisting of a magnet unit, indicated generally at 26, and a cooperating armature unit comprising a screw 27 having a head 28, the inner portion of which is recessed slightly in the edge surface of the door 20. As will be readily apparent, the armature and magnet units are mounted in coacting positions in the free vertical edge of the door 20 and in the adjacent surface of the frame portion 22, respectively, so that the head portion 28 of the armature screw 27 can coact with the magnet unit 26 when the door 20 is in closed position against the door stop 24. As a matter of convenience the magnet unit 26 will generally be best suited for installation in the door frame with the armature screw 27 being secured to the door, as shown in Fig. 1. However, it is also within the scope of my invention to reverse the respective mountings of the magnet and armature units so that the magnet unit is located in the door and the armature unit is attached to the frame.

Referring now to Figs. 2 to 4, the magnet unit 26 has an outer tube or sleeve 29 of a magnetic metal (i. e. a metal of high magnetic permeability such as steel) with a generally cup-shaped end member 31 secured in one end of the tube 29. The member 31 is of non-magnetic metal such as brass or aluminum and has an enlarged cylindrical portion 32 of the same diameter as the tube 29 so as to form an extension thereof and an integral cylindrical portion 33 of smaller diameter, the portion 33 having a tight press fit within the tube 29 as clearly seen in Fig. 2. The inner end of the cylindrical portion 33 is turned inwardly to provide a radial flange or stop 34 for the purpose hereinafter described. The tubular element 29 with the attached non-magnetic end member 31 has a tight press fit within a complementary bore 36 extending inwardly on a horizontal axis from the vertical edge of the door frame 22, and the enlarged cylindrical portion 32 of the non-magnetic member 31 is formed with an outwardly extending flange 37 which is recessed slightly in the door frame so as to provide a flush surface with the frame.

A magnet element 38 in the form of an elongated cylindrical bar magnet having a positive pole at one end and a negative pole at the other end is movably disposed within the tube 29. Any suitable magnetic metal or alloy may be used for the magnet element 38, but the alloy of aluminum, nickel and cobalt commercially known as "Alnico" is particularly suitable. For maximum convenience and economy, the magnet element 38 may be cut from elongated bar stock and no special machining or finishing operations are necessary for the rough cast surfaces of the individual magnet elements. An insulating collar or bushing 39 of non-magnetic material is interposed between the steel tube 29 and the magnet element 38 adjacent the inner end portion of the latter, the bushing 39 being shown in this instance as made of plastic material and rigidly secured by a press fit on the magnet element 38. As best seen Fig. 4, the inner periphery of the plastic bushing 39 is provided with a plurality of spaced longitudinal ribs or flutes 41 which may be deflected slightly as required in order to permit a tight press fit of the bushing 39 over magnet elements having slightly different external diameters. In addition to plastic, other non-magnetic or insulating materials such as brass, aluminum or wood may be used for the bushing 39. As described hereinafter, there is a slight clearance 42 (exaggerated for purposes of clarity in the drawings) between the bushing 39 and the tube 29, but this clearance is kept as small as possible in order to center the magnet element 38 in substantially coaxial relation within the tube 29 while still permitting axial or longitudinal movement of the magnet element 38 (and the attached bushing 39) withint he tube 29. Although not illustrated in the drawings, it is also within the scope of my invention to fit the bushing 39 rigidly in the interior of the tube 29 so that the necessary slight clearance for maintaining the parts in coaxial but movable relation will be between the bushing and the magnet.

By reason of the combination of the steel tube 29, the central movable magnet 38, and the insulating bushing 39, a very simple yet effective operating relationship is provided. There is a strong magnetic attraction acting radially between the tube 29 and the magnet 38, but because of the presence of the insulating bushing 39 having the slightest possible clearance 42 relative to the tube 29, the cylindrical magnet element 38 is effectively retained in substantially centered or coaxial relation within the tube 29 while the bushing 39 engages the tube 29 at some point with only very slight force. In other words the effect of the bushing 39 is to distribute and substantially equalize the magnetic attractive forces between the magnet 38 and the tube 29 so that the magnet approximates a "floating" relation within the tube 29. Under these circumstances, the magnet element 38 is retained within the tube 29 solely by magnetic forces but is also free to undergo longitudinal or axial movement within the tube 29 with a minimum of frictional resistance or drag. As previously mentioned, in order to obtain this desirable condition of balanced magnetic attraction it is quite important that the clearance 42 be held to an absolute minimum so that the movable magnet element is retained in substantially coaxial relationship with the tube 29. The greater the clearance 42, the more the magnet 38 will be off-center and the greater will be the tendency for the magnet to adhere to one point at the inner periphery of the tube 29 with a consequent high degree of drag or frictional resistance to longitudinal movement of the magnet element.

Because of the strong magnetic attraction between the steel tube 29 and the magnet element 38, the "floating" magnet element is effectively retained within the tube 29 by magnetic forces which act in much the same resilient manner as if a spring were provided for holding the magnet in the tube. Moreover, as seen in Fig. 3, the magnet 38 is normally held in longitudinally centered relation with respect to the outer steel tube. Thus, in Fig. 3 wherein the magnet 38 is somewhat longer than the tube 29, it will be seen that the opposite ends of the magnet 38 extend substantially an equal distance beyond the corresponding ends of the steel tube 29, and in this retracted position of the magnet element the outermost end thereof, indicated at 43, is substantially flush with the flange 37 and the adjacent surface of the door frame 22. Although the "floating" magnet 38 is held by the balanced magnetic attractive forces in longitudinally centered relation with respect to the outer tube 29, nevertheless, because of the leakage gap therebetween the magnet element 38 can be caused to shift axially into an extended or projecting position shown in Fig. 2 wherein the outermost contact end 43 of the magnet element engages the head portion 28 of the armature screw 27 when the door 20 is in closed position. In other words, the magnetic attractive force between the armature and the outer end 43 of the magnet 38 is great enough to overcome the magnetic attractive forces coacting between the steel tube 29 and the magnet element 38 tending to hold the latter in longitudinally centered relationship within the tube.

Thus, the invention provides a fairly simple and inexpensive retractable magnet unit which does not require the use of a spring or like resilient mechanical device. When the door is open, the magnet element 38 is held in retracted position as seen in Fig. 3. When the door is closed, the magnet element 38 shifts to the left into contact with the head 28 of the armature screw 27 as seen in Fig. 2, and when the door is again opened so that the contact between the magnet element 38 and the armature is disrupted, the magnet element is automatically retracted to its Fig. 3 position. During inward and outward movement of the magnet element 38, the travel of the magnet is guided by the bushing 39 at its inner or right-hand end (as viewed in the drawings) and is also guided by the flange 34 at its outer or left-hand end. In other words, the non-magnetic end member 31 is in effect a cup-shaped member having a central aperture at its base provided by the flange 34 and through which the magnet element 38 extends at its left-hand end for longitudinal shifting movement. During axial movement of the magnet and in all positions thereof the magnet is retained against cocking or angular movement so that the desired coaxial relationship with the tube 29 is maintained. In addition, the flange 34 also provides a stop which coacts with the adjacent end of the bushing 39 to prevent inadvertent withdrawal or theft of the magnet element. As seen in dotted lines in Fig. 3 movement of the magnet element 38 to extended or projected position is limited by engagement of the axial end of the bushing 39 with the flange 34. Of course, it will be understood that the axial depth of the bore 36 in the frame 22 is of sufficient magnitude to accommodate the projecting inner end of the magnet element 38 in its normally retracted position.

I have found that the ratio of the length of the steel tube 29 to the length of the magnet element 38 is an important factor in obtaining the most effective operation of the catch. Because of the tendency for the "floating" magnet element 38 to be retained in longitudinally centered relation within the tube 29, it will readily be understood that the longer the steel tube 29 is in relation to the magnet 38, the more difficult it is to cause the magnet 38 to be attracted axially from the tube 29 by an armature element. As will be seen hereinafter in connection with a different modification of the invention, when the steel tube 29 is longer than the magnet element, the ends of the magnet element will be spaced inwardly from the ends of the steel tube when the magnet is in its normal retracted position, i. e. centered longitudinally with respect to the steel tube. Consequently, the distance or air gap between the armature and the adjacent end of the magnet element when the door is closed may be so great that the magnetic attractive forces tending to hold the magnet within the tube cannot be overcome. Accordingly, I prefer to have the magnet longer than the steel tube, as illustrated in Figs. 2 to 4. This arrangement also has the advantage that it provides greater effective travel of the magnet element so that the magnet can readily operate for varying clearances between the door 20 and the frame 22. However, by varying the relationship between the length of the steel tube 29 and the magnet element 38, it is possible to modify the action of the catch dependent upon the holding power required for any given installation.

In Figs. 2 to 4, the magnetic catch of the present invention is installed to operate as a friction catch. As illustrated in Fig. 2, the outer end 43 of the magnet element 38 engages the head 28 of the armature screw 37 in frictional surface contact therewith. This engagement between the magnet and armature elements provides a substantial frictional resistance against pivotal movement of the door 20 so that the latter is securely held in closed position. Moreover, since the magnetic attractive forces are exerted laterally of the door and substantially in the plane thereof, the door is held to a considerable extent against rattling movement. In the conventional friction catch of the non-magnetic type comprising a spring pressed plunger adapted to coact with a strike member, the effectiveness and ease of operation of the catch depends almost entirely on the close correlation of the spring pressure of the plunger with the clearance between the door and the frame. Obviously, however, these clearances are subject to wide variation and cannot be practically controlled and as a result the amount of frictional resistance which the catch provides for holding the door closed is frequently too great so that operation is difficult or is too slight so that the door is not held securely. A highly important advantage of a magnetic friction catch of the present type is that it will operate very effectively and provide the proper degree of frictional resistance with door and frame assemblies having varying degrees of spacing or clearance therebetween.

When it is desired to open the door, a relatively slight manual pull will serve to effect sliding movement of the contact surface 28 of the armature relative to the contact end 43 of the magnet element until the armature is completely disengaged from the magnet element whereupon the magnet element is automatically retracted into its tube or housing by the action described above. Because of the retractive operation of the magnet unit, the magnet element 38 cannot possibly interfere with the normal operation of the door since the magnet element 38 will remain in its normally retracted position until the armature is moved into partial alignment or overlapping relation with the outer end of the magnet element thereby permitting the attractive forces of the magnet to act on the armature element. In other words, the magnet element 38 can never move out prematurely and cause the door to strike the magnet element because the armature will not effect axial shifting of the magnet element until some substantial portion of the outer end of the armature overlies the corresponding end 43 of the magnet element.

As seen in Figs. 1 to 4, I prefer to mount the magnetic catch in a horizontal position when used as a friction catch because in this way the catch can be positioned at the greatest distance relative to the hinges and the frictional resistance developed by the catch is most effective in holding the door closed. Moreover, the clearance between the vertical edges of the door and frame is less subject to change. However, it is also within the scope of the invention to mount the device shown in Figs. 2 to 3 in a vertical position either at the bottom or at the top of the door. As hereinbefore mentioned, the force tending to hold the magnet within the steel tube is subject to regulation by varying the ratio of the length of the tube to the length of the magnet depending upon the action required. For example, if the magnet unit is to be installed in vertical position at the top of a door frame and with the armature secured in the top edge of the door, a relatively longer steel tube will be required so as to overcome the weight of the magnet and insure holding of the magnet out of the path of the door. On the other hand, if the magnet unit is installed vertically at the bottom of the door, a shorter steel tube can be employed since the weight of the magnet element itself will tend to hold the magnet in retracted position.

As described above, the magnetic catch of the present invention is particularly well suited for use as a friction catch wherein the magnetic attractive forces are exerted in a generally lateral direction and substantially in the plane of the door, the door being held in closed position merely by frictional resistance between the contact surfaces of the magnet and armature elements. However, the device may also be used to good advantage by mounting the magnet unit at right angles to the plane of the door so that the magnetic attractive forces act generally transversely to the plane of the door for holding the door in closed position. Referring to Fig. 5, an upper corner portion of a cabinet frame is shown comprising an upright 44 and a cross member 46. A magnet unit designated generally at 47 and of the same type hereinbefore described in detail is mounted in a wood block 48 which is secured, as by gluing, to the frame members 44 and 46. Although the door is not shown in this view, it will be understood that a suitable armature element, such as a screw 27 hereinbefore described, is secured to the inner flat surface of the door in coacting position with the magnet unit 47 so that when the door is closed the movable magnet element will move outwardly into contact with the armature at the inside of the door. With this arrangement, the magnetic attractive forces tending to retract the magnet element within the outer steel tube provide a positive force tending to hold the door in closed position in much the same resilient manner as if the magnet element were urged inwardly by a spring member. Obviously, when the door is opened, the end of the bushing 39 will engage the stop 34 so as to provide a breaker action for disrupting the magnetic contact between the catch elements upon combined movement of the door to fully open position and the magnet element will thereafter be retracted automatically as previously described.

In Fig. 6, I have shown a further modification wherein the magnet unit, designated generally at 49, is also mounted for the same general mode of operation described in Fig. 5. In this instance, an upright of the cabinet frame is indicated at 51 with a horizontal shelf being provided at 52. The magnet unit 49 is mounted in a clip or support 53 which may be integral with or separate from the magnet unit 49 and which is mounted at the underside of the shelf 52 by a plurality of screws 54. A suitable armature element is secured to the inner surface of the door for operation in the same manner as described in connection with Fig. 5.

In Figs. 7 to 9, I have shown a modified form of the invention wherein the outer steel tube of the magnet unit is longer than the magnet element. The door 20, the frame 22, and the armature screw 27 are identified by the same reference numerals as used in connection with Figs. 2 to 4. In this case, however, the outer steel tube is an elongated one-piece member 56 fitted into a complementary bore 57 in the frame 22 and having a flanged outer end 58 which is recessed slightly to provide a flush surface with the door frame 22. The movable magnet element is indicated by the reference numeral 59 and is fitted at its inner or right-hand end with an insulating bushing 61 which in this case is a non-magnetic metal such as brass. As before, the bushing 61 is rigid with the magnet element 59, as by a press fit, and an annular clearance 62 between the bushing 61 and the tube 56 is maintained at a minimum in order to provide the desired coaxial relationship. As a stop for preventing complete withdrawal of the magnet element 59 and the tube 56, a ring or collar 63 of non-magnetic metal such as brass is press fitted within the steel tube 56 adjacent the outer end thereof, and the outer or left-hand end of the bar magnet 59 projects through the ring 63 so that the latter also serves to guide the magnet during its back and forth travel. In Fig. 8 the magnet 59 is shown in its normally retracted position when the door is open, and it will be seen that the magnet is centered longitudinally of the tube 56. In other words, the tube 56 projects at each end thereof to substantially the same extent beyond the corresponding end of the magnet 59. In dotted lines in Fig. 8, the extreme projected position of the magnet element 59 is shown whereby the end of the insulating bushing 61 abuts the rigid stop collar 63 to prevent withdrawal or theft of the magnet element.

Figs. 10 to 12 illustrate a further modification of the embodiment described above in connection with Figs. 2 to 4. Again, the door 20, the frame 22, and the armature screw 27 with the head portion 28 are identified by the same reference numerals. In this instance, the outer steel tube or sleeve is designated generally at 64 and comprises an inner end portion 66 of reduced diameter and an outer end portion 67 of relatively larger diameter with a smoothly curved integral neck or connecting portion 68 therebetween. The outer cap or end member is designated at 69, this member being of brass or other non-magnetic metal and having the same general shape as the member 31 in Figs. 2 to 4. By providing an inner end portion 66 of reduced diameter on the tube 64 it will be seen that insertion of the magnet unit into a bore 71 in the frame 22 is more readily accomplished, and the smoothly curved neck portion 68 greatly facilitates the pressing of the unit into the bore 71 so as to provide a tight press fit between the enlarged tube portion 67 and the bore 71. In this instance, the insulating collar or bushing is in the form of a tubular element 72 of brass or other non-magnetic metal having a plurality of longitudinal internal ribs 73 which provide a tight press fit with the magnet element, indicated at 74. It will be understood that the ribs 73 serve the same purpose as the flutes 41 of the plastic collar 39 in Figs. 2 to 4, namely, to accommodate varying tolerances and out of round configurations for the rough cast magnet element. The outer end of the insulating collar 72 is flared outwardly to a slight extent, as at 76, in order to facilitate pressing of the collar onto the magnet element 74. In addition, the outwardly flared end portion 76 also functions as a stop for abutting the flange portion, indicated at 77, on the brass end member 69 so as to prevent inadvertent withdrawal or theft of the magnet element in the same general manner as hereinbefore described. Also, in some instances, it may be desirable for the flared end portion 76 to coact with the neck portion 68 on the outer steel tube in order to limit the inwardly retracted position of the magnet element dependent upon the requirements of the particular installation involved.

In Figs. 13 to 15, I have illustrated still another modification of the invention wherein the magnet unit is again mounted in the door frame 22 and the armature unit is mounted on the door 20. In this case, the magnet unit has an elongated one-piece tubular housing 78 of non-magnetic metal such as brass. The outermost end portion of the housing 78 has an enlarged diameter, as at 79, and is provided with a flange 81 which is recessed in the outer surface of the frame 22. The housing 78 also has an intermediate portion 82 of reduced diameter adjacent the outer end portion 79 and defining a shoulder 83 therebetween. The innermost end portion of the housing 78 has a still further reduced diameter, as at 84, and an apertured end wall 85 is also provided. The end wall 85 is desirable in order to prevent the magnet element from falling out of the housing during handling of the device prior to installation. Also, the end wall 85 serves to prevent the magnet element from becoming wedged in the bore in the door frame 22 in the event that the magnet element is pushed inwardly too far.

An outermost steel sleeve 86 surrounds the non-magnetic housing 78 and has a tight press fit at one end thereof around the intermediate portion 82 of the brass housing, the outermost end of the steel sleeve 86 seating against the shoulder portion 83 of the housing 78. The opposite or inner end of the steel sleeve 86 has an inwardly curved lip portion 87 which fits around the reduced diameter portion 84 of the brass housing 78. As will readily be understood, the smoothly curved end flange 87 avoids a sharp corner edge at the inner end of the steel tube 86 and thereby permits the latter to be fitted quite readily into the open end of the receiving bore, indicated at 88, in the door frame 22. Thus, the outermost steel sleeve 86 has a tight frictional fit within the bore 88 for retaining the magnet unit in the door frame 22.

The elongated cylindrical magnet element is designated at 89 and has tightly fitted at its inner end a brass or other non-magnetic bushing 91. A small bushing or stop collar 92 of brass or other non-magnetic material has a tight press fit within the housing portion 79 and seats against the shoulder 83. As before, this collar coacts with the magnet bushing 91 to prevent inadvertent withdrawal or theft of the magnet element 89 from its housing. Of course, the forward end of the magnet 89 extends through the collar 92 and is guided thereby. The general manner of operation of the magnet unit is the same as described hereinbefore in connection with the other modifications of the invention. The radially acting magnetic attractive forces are between the magnet element 89 and the outermost steel sleeve 86. In this instance, however, the outer steel sleeve and the concentric magnet element are separated annularly by the stationary non-magnetic housing 78 as well as by the non-magnetic guide bushing 91 which moves as a unit with the magnet element 89. Of course, the annular clearance, designated at 92, between the guide bushing 91 and the housing 78 is held to a minimum.

The armature arrangement in this modification of the invention comprises a screw 93 having a tapered head portion 94 and an apertured washer 96 mounted on the screw 93. The washer 96 is received within an enlarged recess 97 in the door 20, and the aperture in the washer 96 has a tapered wall portion 98 which conforms generally to the tapered head 94 on the screw 93. In mounting the armature unit, the screw 93 is incompletely tightened so that the washer 96 is held relatively loosely on the screw and within the recess 97. By reason of this looseness and also by reason of the clearance provided between the tapered portions 94 and 98, the washer 96 can undergo limited cocking or tilting movement relative to the door 20 whenever necessary. Thus, in Fig. 13 the situation is illustrated wherein the door 20 and the frame 22 are in perfect alignment so that the outer contact face of the magnet element 89 can make full surface contact with the armature or washer 96 without any angular cocking movement of the latter. However, in Fig. 14, the door 20 is shown out of alignment to an exaggerated degree relative to the frame 22. Nevertheless, because of the loose mounting of the washer 96 it is still possible for the magnet element 89 to make full surface contact with the armature element because the latter can undergo relative cocking or angular movement in order to align itself with the magnet element. Thus, the full magnetic attractive power of the magnet element is utilized in spite of misalignment of the door and frame members. Obviously, if the armature washer 96 were rigidly held on the door 20, it would be impossible for the magnet element 89 to make full face contact with the armature and consequently the effective holding power of the magnet would be drastically reduced. This is, of course, a particularly important feature when the magnetic catch is mounted adjacent the edges of the door and frame members so that frictional surface contact is relied upon to hold the door in closed position.

Although the invention has been described with particular reference to certain specific structural embodiments, it will be understood that various equivalent structures and modifications may be resorted to without departing from the scope of the invention as defined in the appended claims.

I claim:

1. In a magnetic catch, a magnet unit comprising a sleeve element of magnetic metal, a magnet element disposed within said sleeve element for axial movement relative thereto, and non-magnetic bushing means interposed between said elements and holding the latter in substantially coaxial relation, said magnet element having an unobstructed and exposed end surface and being shiftable axially under the influence of an armature whereby said end surface is adapted to contact the surface of the armature.

2. In a magnetic catch, a magnet unit comprising a tubular element of magnetic metal, a magnet element movably disposed within said tubular element, and non-magnetic bushing means interposed between said elements and rigidly secured to one of said elements for holding the magnet element in axially movable substantially coaxial relation in said tubular element, said magnet element having an unobstructed and exposed end surface and being shiftable axially under the influence of an armature whereby said end surface is adapted to contact the surface of the armature.

3. A magnet unit for a magnetic catch comprising a tube of magnetic metal, a magnet disposed within the tube for axial movement therein, and non-magnetic insulating means interposed between the tube and the magnet for substantially centering the magnet coaxially within the tube but permitting free axial movement of the magnet relative to the tube, said magnet having an unobstructed and exposed end surface and being shiftable axially under the influence of an armature whereby said end surface is adapted to contact the surface of the armature.

4. In a magnetic catch, a magnet unit comprising a sleeve element of magnetic metal, an elongated magnet element disposed within said sleeve element for axial movement therein, and a generally annular bushing of non-magnetic material interposed between said elements and holding the magnet element in substantially coaxial relation within the sleeve element whereby the magnetic attractive forces acting radially between said elements are substantially equally distributed so that the magnet element is normally retained in substantially floating relation within said sleeve element, said magnet element having an unobstructed and exposed end surface and being readily movable outwardly beyond the end of said sleeve element under the influence of an armature whereby said end surface is adapted to contact the surface of the armature, and said magnet element being automatically retractable within said sleeve element when the armature is moved away from the magnet element.

5. A magnetic catch for holding a closure member in closed position adjacent a frame member, said catch comprising an armature element adapted to be mounted on one of said members, a tubular element of magnetic metal adapted to be rigidly mounted on the other of said members, an elongated magnet element movably disposed within said tubular element for axial movement therein, and a non-magnetic insulating bushing interposed between the tubular element and the magnet element for holding the latter in substantially coaxial relation within the tubular element whereby the magnetic attractive forces acting radially between the tubular and magnet elements are substantially equally distributed so that the magnet element is disposed in substantial floating relation within said tubular element, said magnet element thereby being axially movable beyond the end of the tubular element into contact with the armature element under the influence of the magnetic attractive forces between the magnet element and the armature element, the latter forces being substantially strengthened as a result of the flux concentrating effect of said tubular element, and said magnet element being automatically retractable within said tubular element when said armature element is beyond the region of influence on said magnet element.

6. In a magnetic catch, a magnet unit comprising a sleeve element of magnetic metal, a magnet element disposed within said sleeve element for axial movement therein, an annular insulating bushing of non-magnetic material interposed between said elements and holding the magnet element in substantially coaxial floating relation within the tubular element, said magnet element being axially movable inwardly and outwardly of said tubular element, and stop means for limiting the extent of outward movement of said magnet element.

7. In a magnetic catch, tubular means comprising a magnetic metal, an elongated magnet element movably disposed within said tubular means, an insulating non-magnetic bushing interposed between said tubular means and said magnet element and rigidly carried at one end portion of said magnet element, said bushing holding the magnet element in substantially coaxial floating relation within the tubular means but permitting axial movement of the magnet element and attached bushing as a unit relative to said tubular means so that the magnet element can move inwardly and outwardly relative to the tubular means, and a stop member rigidly secured on said tubular means and adapted to coact with said bushing for limiting the extent of outward movement of said magnet element.

8. In a magnetic catch, a magnet unit comprising a tubular element of magnetic metal, an elongated magnet element movably disposed within said tubular element and of greater axial length than said tubular element, and a non-magnetic bushing interposed between said elements for holding the magnet element in substantially coaxial floating relation within the tubular element.

9. In a magnetic catch, a magnet unit comprising a tubular element of magnetic metal, an elongated magnet element movably disposed within said tubular element and having a shorter axial length than said tubular element and a non-magnetic insulating bushing interposed between said elements for holding the magnet element in substantially coaxial floating relation within the tubular element.

10. In a magnetic catch, a magnet unit comprising a tubular element of magnetic metal, a non-magnetic member extending rigidly from one end of said tubular element, an elongated magnet element movably disposed within said tubular element, a non-magnetic insulating bushing interposed between said elements and rigidly carried on said magnet element for holding the latter in substantially coaxial floating relation within the tubular element but permiting axial movement of the magnet element inwardly and outwardly of the tubular element, and an annular non-magnetic element carried by said non-magnetic member and extending radially inwardly relative to said tubular element, said magnet element extending through said annular element for guiding the axial movement of said magnet element and said annular element coacting with said bushing for limiting the extent of outward movement of said magnet element.

11. In a magnetic catch, a magnet unit comprising a tubular element of magnetic metal, a non-magnetic member rigidly secured at one end of said tubular element and providing an extension thereof, an elongated magnet element movably disposed within said tubular element, and a non-magnetic insulating bushing interposed between said elements and rigidly carried on said magnet element for holding the latter in substantially coaxial floating relation within the tubular element but permitting axial movement of the magnet element inwardly and outwardly of the tubular element, said non-magnetic member having a radially extending flange portion at the inner periphery of said tubular element with said magnet element extending therethrough for guiding the axial movement of said magnet element, and said flange portion coacting with said bushing for limiting the extent of outward movement of said magnet element.

12. In a magnetic catch, a magnet unit comprising an outer tubular element of magnetic metal having a portion of relatively restricted diameter and a portion of relatively enlarged diameter with a smoothly curved connecting portion therebetween, an elongated magnet element movably disposed within said tubular element, and a non-magnetic insulating bushing interposed between the restricted diameter portion of said tubular element and said magnet element for holding the latter in substantially coaxial floating relation within the tubular element, said tubular element being readily insertable into an axial bore in a supporting member by inserting the end of restricted diameter into the bore and then pressing the portion of enlarged diameter into a tight press fit within the bore.

13. The device of claim 12 further characterized in that the innermost end of said bushing is flared outwardly for limiting the extent of axial movement of said magnet element.

14. In a magnetic catch, a magnet unit comprising a tubular element of magnetic metal, an elongated cylindrical magnet element disposed for axial movement in said tubular element, and an annular bushing surrounding said magnet element and having a tight frictional fit thereon for holding the magnet element in longitudinally movable and substantially coaxial floating relation in said tubular element, said bushing being provided with a plurality of distortable internal ribs for accommodating slight variations in diameter and external configuration of the magnet element.

15. In a magnetic catch, a magnet unit comprising an elongated non-magnetic tubular element, a sleeve of magnetic metal surrounding said tubular element and rigid therewith, an elongated magnet element disposed within said tubular element for relative axial movement therein, and a non-magnetic bushing rigidly secured to said magnet element in concentric relation therearound, said bushing holding the magnet element in substantially coaxial floating relation within the tubular element and its attached external magnetic sleeve but permitting axial movement of the magnet element inwardly and outwardly of the tubular element.

16. The device of claim 15 further characterized in that the external magnetic sleeve is of lesser length than said tubular element and has a smoothly rounded edge at one end thereof to facilitate press-fitting of the magnet unit into a bore in a supporting structure.

17. The device of claim 15 further characterized in that the tubular element is provided with an annular stop collar adapted to coact with said bushing for limiting the extent of outward movement of the magnet element.

References Cited in the file of this patent

UNITED STATES PATENTS

| | | |
|---|---|---|
| 2,508,305 | Teetor | May 16, 1950 |
| 2,514,927 | Bernhard | July 11, 1950 |
| 2,585,714 | Wrobel et al. | Feb. 12, 1952 |